(12) United States Patent
Lin

(10) Patent No.: US 7,343,609 B2
(45) Date of Patent: Mar. 11, 2008

(54) CONTROL MECHANISM FOR CLAMPER GUIDER IN SLOT-IN DRIVE

(75) Inventor: Hung-Jui Lin, Taipei (TW)

(73) Assignee: EPO Science & Technology Inc., Taipei (TW)

( * ) Notice: Subject to any disclaimer, the term of this patent is extended or adjusted under 35 U.S.C. 154(b) by 633 days.

(21) Appl. No.: 10/860,143

(22) Filed: Jun. 4, 2004

(65) Prior Publication Data

US 2005/0273799 A1 Dec. 8, 2005

(51) Int. Cl.
*G11B 17/04* (2006.01)
(52) U.S. Cl. ...................... 720/706; 720/713
(58) Field of Classification Search ................. 720/604, 720/619, 622, 623, 706, 710, 713, 723
See application file for complete search history.

(56) References Cited

U.S. PATENT DOCUMENTS

| | | | |
|---|---|---|---|
| 4,982,399 A * | 1/1991 | Odawara et al. ............ 720/710 |
| 5,867,338 A * | 2/1999 | Ohira et al. ................ 720/627 |
| 6,512,730 B1 * | 1/2003 | Lee et al. ................... 720/622 |
| 6,928,045 B2 * | 8/2005 | Eum et al. ............... 369/270.1 |

\* cited by examiner

*Primary Examiner*—Andrea Wellington
*Assistant Examiner*—Carlos E Garcia
(74) *Attorney, Agent, or Firm*—Troxell Law Office, PLLC

(57) ABSTRACT

A control mechanism for a clamper guider in a slot-in drive comprises a motor used to drive a transmission sheet to move through a gear train; the transmission sheet drives a control sheet to rotate counterclockwise or clockwise and further to cause a raised piece of the control sheet to prop against or separate from the lower end of a downward bended section of the clamper guider to allow a clamper at the lower section of the clamper guider to be separated from or entered the location that a disc is clamped. Whereby, the whole control mechanism has a more power saving structure and the matching design of the whole transmission structure and the motor used therein is more convenient.

9 Claims, 3 Drawing Sheets

US 7,343,609 B2

CONTROL MECHANISM FOR CLAMPER GUIDER IN SLOT-IN DRIVE

FIELD OF THE INVENTION

The present invention relates to a control mechanism for a clamper guider in a slot-in drive, and more particularly to a mechanism controlling the lower section of a clamper guider to move up and down so as to allow a clamper to displace up and down.

DESCRIPTION OF RELATED ART

A general slot-in drive has a thinner outside structure, and is easier for a user to insert and take out a disc; it is usually assembled in a car stereo module to use for playing a disc.

Taiwan patent No. 555,131 "Structure of a slot-in drive" discloses a slot-in drive, comprising a clipper mechanism used for clipping a disc to allow the disc to be slid in or removed from a loading tray; a clamping plate having a clamping tray at the front end thereof, used for clamping the disc with the loading tray respectively from upper and lower ends of the disc, and rotating the disc for an optical read/write head to read data stored in the disc; and a transmission mechanism for controlling the clamping plate to bend or lift so as to clamp or release the disc. A supporting piece in the transmission mechanism is propped against the lower end of propped arm at the flank side of the clamping plate to allow a space to exist between the clamping tray and the loading tray for passing the disc through. When the disc is positioned, the transmission mechanism drives the supporting piece to move in a beeline simultaneously to be separated from the lower end of the propped arm to allow the clamping tray with magnetic force to clamp the disc with the loading tray.

The supporting piece of the transmission mechanism is used to do a linear motion according to the Taiwan patent mentioned above to press the inclined plane at the bottom of the propped arm to allow the clamping tray to be separated from the loading tray until the magnetic force between the clamping tray and the loading tray is overcome. In the process that the propped arm is being pushed against by the supporting piece, the force acted on the supporting piece is not uniform, and because especially at the instant that the clamping tray is caused to separate from the loading tray, the largest force must be exerted, a power from the motor must be increased, this leads to greater energy consumption. Besides, the clamping force is moved rectilinearly, so that the length of a force exerting arm is fixed owing to the limitation of the space inside of the housing of the drive. Therefore, a power saving structure is not easily designed and the whole structure is more complicated and occupies more space.

U.S. Pat. No. 6,577,580 "Loading Device in Magnetooptical Disc Recording Apparatus" discloses a disc recording apparatus comprising two shifters used to drive a damper guider to rotate respectively from the two flanks thereof so as to drive the lower ends of three retainer pieces combined symmetrically to the base to enter or retreat from the lower end of the damper and to cause the clamper to be separated from or attracted with an attracting portion of a disc driving unit. The structure for driving the three retainer pieces when the base according to the U.S. patent mentioned above is rotated is very complicated. And, the separable structure of the clamper and the three retainer pieces must be further connected with a holder lever at the top end of the base to stop the damper separating from the upper side of the base or deviating from the center position of the hole in the base; this increases structure complexity.

SUMMARY OF THE INVENTION

The main object of the present invention is to provide a control mechanism for a clamper guider in a slot-in drive, having a simple structure and capable of accurately controlling a clamper to move up and down.

Another object of the present invention is to provide a control mechanism for a clamper guider in a slot-in drive, having a more power saving structure and convenient for a matching design of a transmission structure and a motor used in a limited space.

Still another object of the present invention is to provide a control mechanism for a clamper guider in a slot-in drive, having a more uniform pull force structure to allow a force exerted on a motor more equally so that a motor with smaller power can be used therefore saving production cost.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 1:
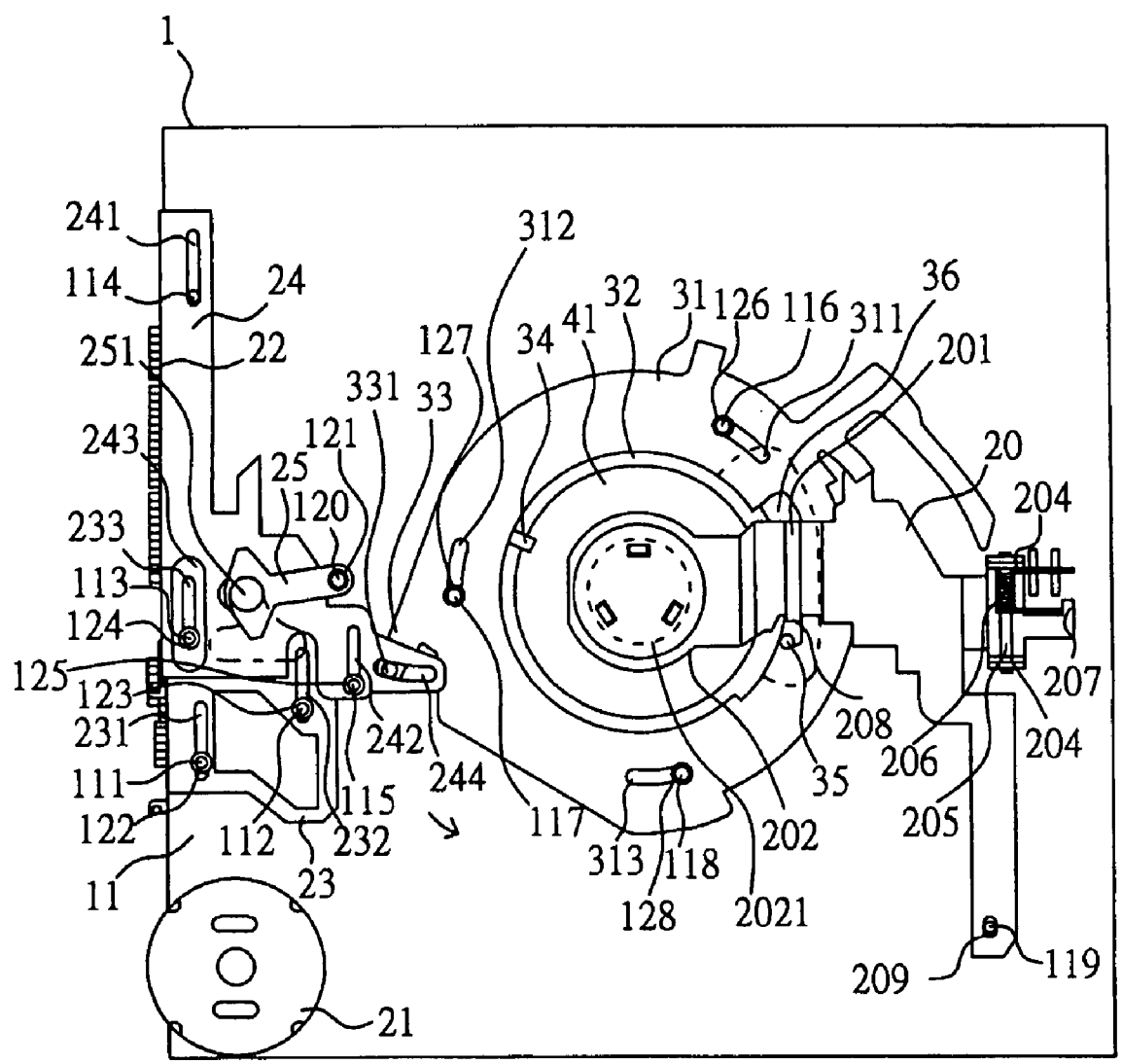
FIG. 1 is a plan schematic view, showing that a clamper is not propped by a control mechanism for a clamper guider according to the present invention.

Please refer to FIG. 1. A control mechanism for a damper guider according to the present invention is combined to a chassis 1 in a slot-in drive to control the front end of a damper guider 20 to move up and down. The control mechanism comprises a gear in a gear train 22 connected to a driving shaft of a motor 21 and another gear in the gear train 22 can be engaged with a rack at the flank side of a first transmission sheet 23. Guide pins 111, 112, 113, 114, 115, 116, 117, 118 and 119 connected at the upper side of a ceiling plate 11 of the chassis 1 are respectively passed through the corresponding guide slots 231, 232, 233, 241, 242, 311, 312, 313 and 209 that are individually disposed in the first transmission sheet 23, a second transmission sheet 24, a control sheet 31 and the damper guider 20. A guide pin 120 is further connected at the upper side of the ceiling plate 11 for being pivotally connected to a hole at one end of a third sheet body 25 and a C-ring 121 is combined with the guide pin 120 outside of the hole. A guide pin 251 is connected to another end of the third sheet body 25; the guide pin 251 is passed through the second transmission sheet 24, the first transmission sheet 23 and the corresponding guide slot in a sequence. A C-ring 122, 123, 124, 125, 126, 127 and 128 is engaged at the upper end of each guiding pin 111, 112, 113, 115, 116, 117 and 118 outside of each corresponding guide slot 231, 232, 233, 242, 311, 312 and 313 to allow the first transmission sheet 23, the second transmission sheet 24 and the third sheet body 25 to be stacked in a sequence so as to be movably connected on the upper side of the ceiling plate 11. A slot 243 is also disposed at a location of the second transmission sheet 24 corresponding to the guide pin 113. An arm 33 is extended at one flank side of the control sheet 31 and a guide pin 331 is connected to the arm 33. A guide slot 244 used for accepting the guide pin 331 is disposed in the second transmission sheet 24. Three slots 311, 312 and 313 are disposed symmetrically at a same circumference in the control sheet 31. Next, please refer to FIG. 2. Holes 32 are respectively disposed at the locations that the ceiling plate 11 and the control sheet 31 are relative to the damper 41 for allowing the clamper 41 to move into the lower side of the ceiling plate 11 to cause the clamper 41 and the magnetic attraction portion of the disc driving unit to attract each other to combine the disc. A retaining sheet 34 is extended from the ceiling plate 11 at the upper side thereof; one end of the retaining sheet is stretched into the hole 32 and extended to the upper side of the clamper 41 so as to block the clamper to be projected out to the upper side of the control sheet 31 too much and allow the clamper 41 to be at a level state and not to touch the disc on a slant to influence the in and out of the disc.

Figure 2:
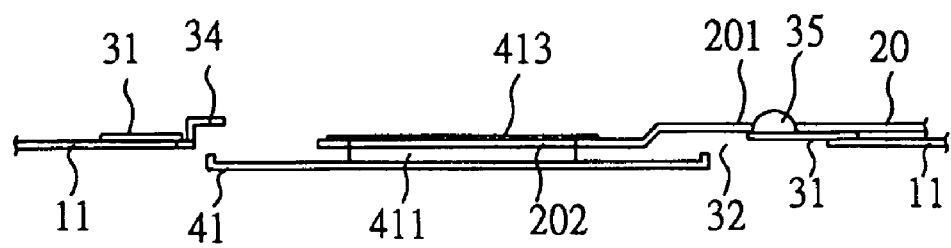
FIG. 2 is a part of side view, showing that a clamper is not propped against by a control mechanism for a clamper guider according to the present invention.
Figure 5:
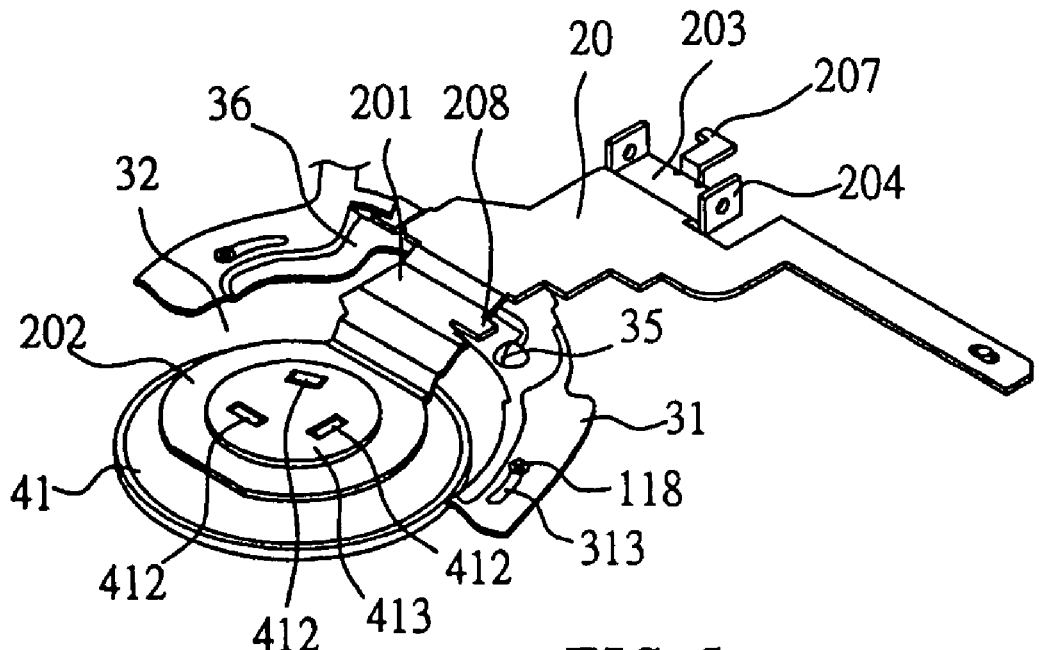
FIG. 5 is apart of three-dimensional schematic view, showing that a clamper is not propped by a control mechanism for a clamper guider according to the present invention.

Please refer to FIGS. 1, 2 and 5. A raised piece 35 is projected upward from the control sheet 31 relative to the flank side of the clamper guider 20; a slant face is formed at the side of the raised piece 35 faced to the clamper guider 20. In this preferred embodiment, the raised piece 35 is formed as a hemisphere shape. A groove 36 bended downward is disposed at a location on the control sheet 31 relative to a bended-downward section 201 of the clamper guider 20 to allow the lower section of the clamper guider 20 connected with the clamper 41 to be stretched into the lower side of the hole 32. A hollow space, relative to the moving area of the groove 36, is existed at the ceiling plate 11 for not blocking the moving of the groove 36. The downward extended lower section 202 of the clamper guider 20 is in the hole 36 that is lower than the downward bended section 201 and at the front thereof. A round hole 2021 is disposed in the middle of the lower section 202; three bayonets 412 of a neck portion 411 projected upward in the middle of the clamper 41 are passed through the round hole 2021 to buckle respectively in the corresponding buckling holes in a buckling sheet 413 for connecting the neck portion 411 of the clamper 41 pivotally in the round hole 2021 so that the clamper 41 can be rotated freely. A rear section 203 concaved downward is disposed at the rear end of the clamper guider 20. Two ear sheets 204 are extended upward at the two sides of the rear section 203 and two ear sheets are also extended on the ceiling plate 11 relative to the two ear sheets 204; all of the ear sheets have holes to be connected pivotally to an axis 205. A torsion spring 206 is combined with the axis 205 whose two ends are respectively installed between the ceiling plate 11 and a buckling ear 207 projected upward at the rear end of the rear section 203. The torsion spring 206 is used to provide a force pressing the lower section 202 downward.

Figure 3:
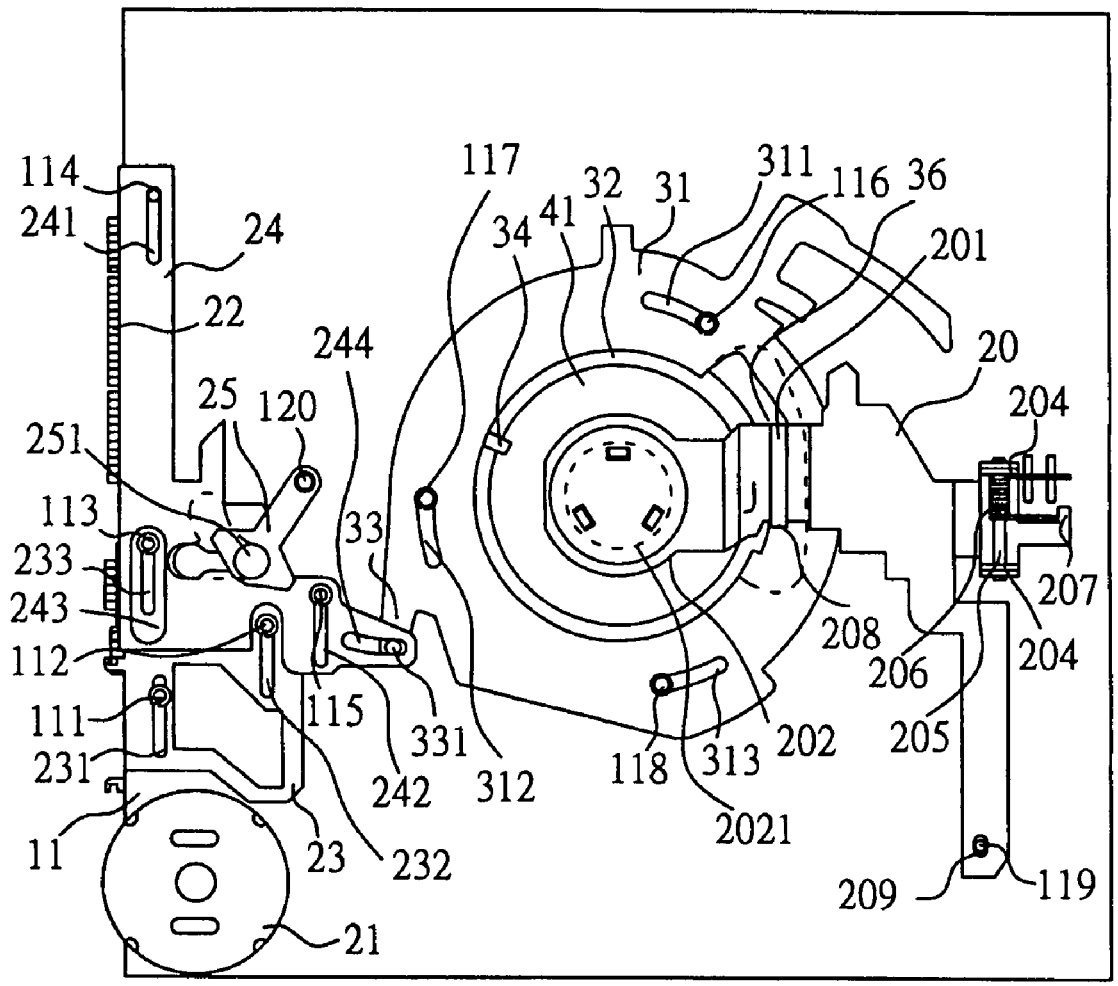
FIG. 3 is a plane schematic view, showing that a clamper is propped by a control mechanism for a clamper guider according to the present invention.
Figure 4:
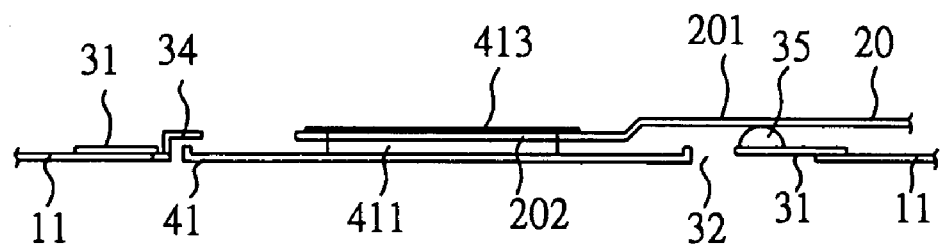
FIG. 4 is a part of side view, showing that a clamper is propped by a control mechanism for a clamper guider according to the present invention.
Figure 6:
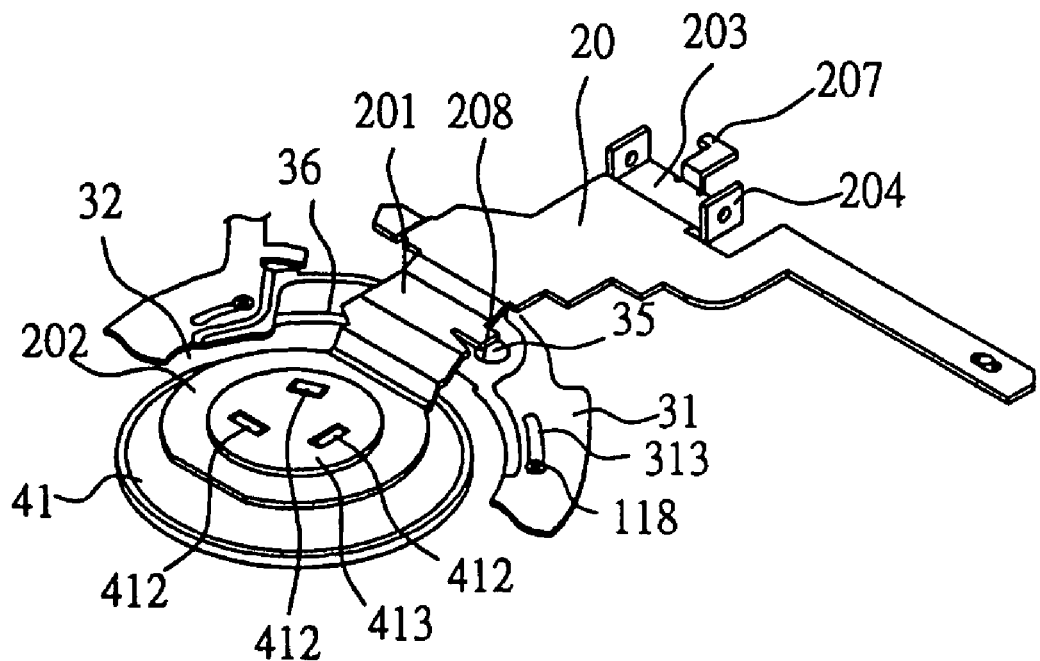
FIG. 6 is a part of three-dimensional schematic view, showing that a clamper is propped against by a control mechanism for a clamper guider according to the present invention.

When the motor rotates toward one direction, the first transmission sheet 23 is driven through the gear train 22 to move downward as FIG. 1 shows. Because the guide pin 251 is respectively connected pivotally to the slots of the first transmission sheet 23 and the second transmission sheet 24, the second transmission sheet 24 is also driven by the guide pin 251 to move downward to cause the slot 244 to drive the guide pin 331 to move downward so as to allow the three slots 311, 312 and 313 in the control sheet 31 to take respectively the guide pins 116, 117 and 118 as fulcrums to rotate counterclockwise. The lower end of the downward bended section 201 of the clamper guider 20 is further propped against by the raised piece 35 to cause the lower section 202 and the clamper 41 to be elevated (as FIGS. 3, 4 and 6 show) to separate the clamper 41 from the location that the disc is clamped. An upward bended sheet 208 is projected out at the location that the downward bended section 201 is contacted with the raised piece 35 to allow the raised piece 35 to prop against the lower side of the upward bended sheet 208 more smoothly.

When the motor 21 rotates toward another direction, the control sheet 31 is rotated clockwise to cause the raised piece 35 to be retreated from the lower side of the downward bended section of the clamper guider 20. The lower section 202 is caused to move downward through the elastic force yielded from the torsion spring 206 to allow the clamper 41 to enter the lower side of the hole 32 so as to be attracted with the magnetic attraction portion of the disc driving unit to clamp the disc.

The groove 36 bended downward at the location of the control sheet 31 relative to the downward bended section 201 of the clamper guider 20 and the hollow area relative to the moving area of the groove 36 disposed in the ceiling plate 11 according to the present invention can allow the moving of the groove 36 not to be blocked. The lower section 202 of the clamper guider 20 can be moved down deeper and the upper end of the camper guider 20 can be moved up less to reduce the height that the upper end of the clamper guider 20 is projected out of the ceiling plate 11 while moving so that the height of the slot-in drive can be reduced.

The control sheet 31 is allowed to take the guide pins 116, 117 and 118 as a supporting point according to the present invention to be rotated clockwise or counterclockwise. A structure being more energy saving and suitable for driving the control sheet 31 to rotate can be configured out by using the disposition location and the length of the adjusting arm 33; the structure is simpler. And, the up-and-down moving of the clamper can be controlled accurately.

The contact face at the upward bended sheet 208 for the raised piece 35 to prop against the upward bended sheet 208 according to the present invention is designed to form an arc so that a more equal output force and more uniform thrust structure can be obtained. Whereby, a motor with smaller power can be used to save the production cost.

It is noted that the control mechanism for a clamper guider in a slot-in drive described above is the preferred embodiment of the present invention for the purpose of illustration only, and are not intended as a definition of the limits and scope of the invention disclosed. Any modifications and variations that may be apparent to a person skilled in the art are intended to be included within the scope of the present invention.

What is claimed is:

1. A control mechanism for a clamper guider in a slot-in drive, comprising a control sheet connected at the upper side of a ceiling plate on a chassis; an arm being extended from the side of said control sheet and three guide slots being symmetrically disposed at a same circumference; a guide pin is combined with said arm and said guide pin being passed through a guide slot in a transmission; said transmission sheet being movable on the upper side of said ceiling plate; three guide pins being connected at a location at the upper side of said ceiling plate relative to said three guide slots in said control sheet and said guide pins being passed through and out of said guide slots to combine each with a C-ring; a clamper being combined with a lower section extended downward from the front end of a clamper guider and the rear end of said clamper guider being connected pivotally to said ceiling plate; a spring for providing said clamper with a downward suppressing force being installed between said clamper guider and said ceiling plate; a hole section is respectively disposed in locations of said ceiling plate and said control sheet relative to said clamper, the hole section extends in a concentric circle and is located in between the control sheet and the clamper; a raised piece projected upward and relative to the side of said clamper guider being installed on said control sheet and a slant face being formed at one side of said raised piece facing to said clamper guider; a motor and transmission gear train being combined with said chassis; whereby, said transmission is driven to move by said motor through said transmission gear train and said control sheet being driven by said transmission to take said three guide pins as supporting point to be rotated counter-clockwise or clockwise so as to allow said raised piece of said control sheet to slide against or separate from the lower end of said clamper guider to control said clamper to separate from or enter the location that a disc is clamped.

2. The control mechanism according to claim 1, wherein a downward bended section bended downward is disposed at a location at said clamper guider close to said hole section, a groove bended downward is disposed at a location that said control sheet is in contact with said downward bended section; whereby, the lower section of said clamper guider connected to said clamper is allowed to stretch into the lower side of said hole section; a hollow area exists in said ceiling plate relative to the moving area of said groove.

3. The control mechanism according to claim 1, wherein said raised piece has a curved exterior surface.

4. The control mechanism according to claim 1, wherein the transmission comprises a first transmission sheet, a second transmission sheet and a third sheet body wherein the upper side of said ceiling-plate is connected movably with said a first transmission sheet and connected pivotally to one end of said third sheet body; the other end of said third sheet body is connected to a guide pin, said guide pin is passed through said second transmission sheet, a guide slot corresponding to said first transmission sheet and said ceiling plate.

5. The control mechanism according to claim 1, wherein a round hole is disposed in the middle of said lower section, bayonets on a neck portion projected upward and disposed in the middle of said clamper are passed through said round hole to buckle corresponding buckling holes in a buckling sheet; whereby, said neck portion of said clamper is caused to connect pivotally to said round hole.

6. The control mechanism according to claim 1, wherein a retaining sheet is extended upward from said ceiling plate; one end of said retaining sheet is stretched into said hole and extended to the upper side of said clamper.

7. The control mechanism according to claim 2, wherein an upward bended sheet is projected out of a location at said downward bended section to contact said raised piece.

8. The control mechanism according to claim 4, wherein said guide slots in said ceiling plate of said chassis relative to said first transmission sheet and said guide slot of said second transmission sheet are respectively combined with guide pins passed through the corresponding guide slot.

9. The control mechanism according to claim 8, wherein a driving shaft of said motor is combined with a gear in said transmission gear train; a rack is disposed at one side of said first transmission sheet so as to engage with another gear in said gear train.

* * * * *